E. FLENTJE.
SHOCK ABSORBER.
APPLICATION FILED SEPT. 15, 1919.

1,365,030.

Patented Jan. 11, 1921.

Inventor:
Ernst Flentje
by Heard, Smith & Tennant.
Attys.

UNITED STATES PATENT OFFICE.

ERNST FLENTJE, OF CAMBRIDGE, MASSACHUSETTS.

SHOCK-ABSORBER.

1,365,030.

Specification of Letters Patent.

Patented Jan. 11, 1921.

Application filed September 15, 1919. Serial No. 323,914.

*To all whom it may concern:*

Be it known that I, ERNST FLENTJE, a citizen of the United States, residing at Cambridge, county of Middlesex, State of Massachusetts, have invented an Improvement in Shock-Absorbers, of which the following description, in connection with the accompanying drawing, is a specification, like characters on the drawing representing like parts.

This invention relates to shock absorbers adapted for use on automobiles and similar structures for preventing the recoil of a spring and especially to shock absorbers of that type having a liquid containing cylinder and a valved piston within the cylinder. As illustrating shock absorbers of this general type reference may be made to my former Patents No. 1,227,126 May 22, 1917; No. 1,013,384 January 2, 1912; No. 1,045,136 November 26, 1912; No. 1,267,532 May 28, 1918.

The object of my present invention is to provide a shock absorber of the type illustrated in the above mentioned patents, which is provided with a novel construction by which the oil or liquid in the cylinder is prevented from leaking past the piston rod. I accomplish this object by providing an improved packing situated in the end of the cylinder and arranged so that any pressure which is developed in the cylinder by the movement of the piston will cause the packing to hug the piston rod with increased force.

In order to give an understanding of my invention I have illustrated in the drawings a selected embodiment thereof, which will now be described, after which the novel features of the invention will be pointed out in the appended claims.

Figure 1:
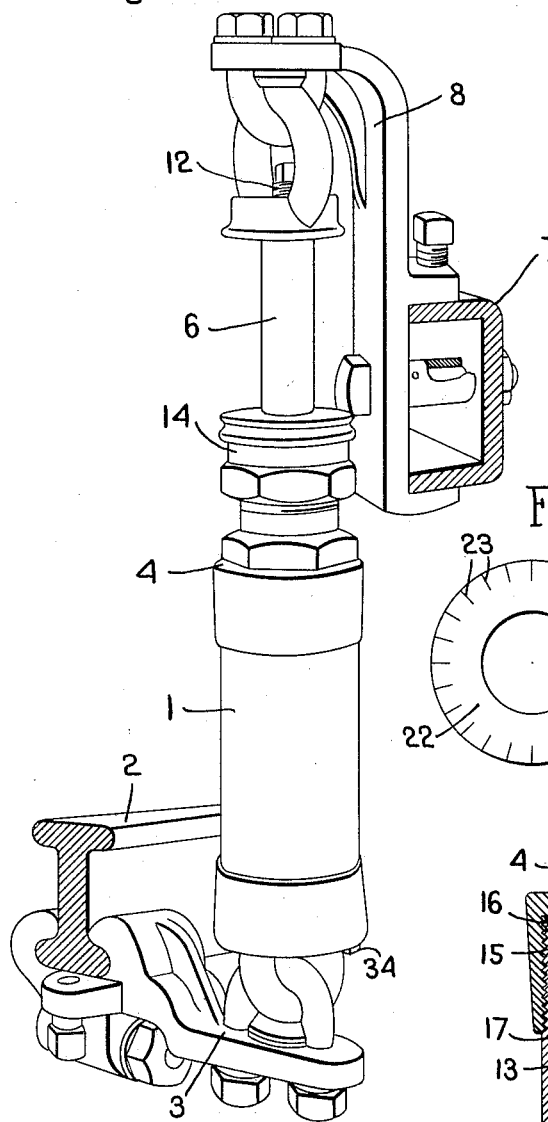
Figure 1 is a perspective view of a shock absorber embodying my invention.
Figure 2:
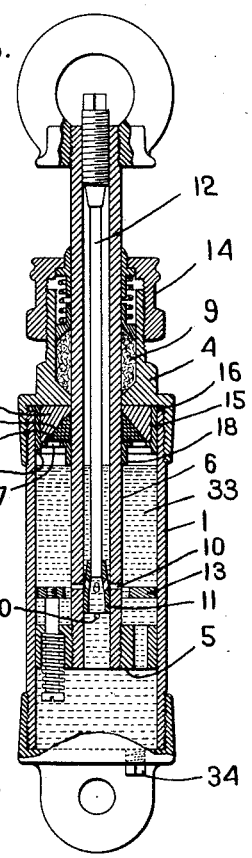
Fig. 2 is a longitudinal sectional view thereof.
Figure 4:
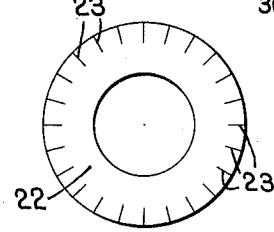
Fig. 4 is a view of the resilient disk through which the pressure is transmitted to the packing.

The cylinder of the shock absorber is indicated at 1 and is shown as connected to the axle 2 of the automobile by means of a suitable bracket 3. The upper end of the cylinder is closed by a cylinder head 4. The valved piston operating in the cylinder is indicated at 5 and it is provided with a piston rod 6 which extends through the cylinder head 4 and is connected to the automobile chassis 7 by means of a suitable bracket 8. The cylinder head 4 is provided with the usual packing 9. The piston rod is hollow and is provided with ports 10 and 30 which are controlled by a piston valve 11 which is operable from the end of the piston rod by means of the valve stem 12. The piston 5 is provided with ports which are controlled by a valve 13.

The parts thus far described are or may be all as illustrated in my above-mentioned patents and, therefore, constitute no part of my present invention.

In the use of shock absorbers of this type, it is important that there should be no leakage of the liquid 33 from the cylinder because it is necessary that the cylinder should be nearly full of liquid in order that the device may operate properly.

The stuffing box illustrated in some of my prior patents will effectually prevent leakage of the liquid around the piston rod provided the cap nut 14 is tightened occasionally as wear occurs, but it is a well-known fact that some operators of automobiles pay little attention to making adjustments on any part as wear occurs, and if the shock absorber illustrated in my prior patents is entirely neglected, then after a long continued use there is a possibility that a slight leakage of the liquid would occur through the stuffing box in the cylinder head. In order to avoid this possibility I have provided herein an improved form of packing, which is located within the cylinder adjacent the cylinder head 4 and which is constructed so that pressure developed in the cylinder by the upward movement of the piston will operate to automatically tighten the packing around the piston rod. The packing will thus be tightened at the time when such action is necessary to prevent any leakage.

In the preferred embodiment of my invention, I employ a cup shaped casing 15 which is situated within the cylinder 1 and is provided at its open end with an outwardly directed flange 16 that is clamped between the end of the cylinder 1 and the cylinder head 4. This casing 15 is provided with perforations 17 in its lower end and is also provided with a hub portion 18 which fits around the piston rod 6. Situated within the casing 15 is a member 19 having a conical shaped bore 20. Said member 19 is cylindrical and of a dimension to fill the casing 15 and it is arranged so that the larger end of the bore is directed toward the cylinder and communicates with the interior of the cylinder through the apertures 17. 21 indicates packing material which is placed within the tapering bore 20 of the member 19, said packing being preferably in the form of a plurality of superposed washers of different diameter. 22 indicates a thin flexible metallic disk or washer which rests on the bottom of the casing 15 and covers the apertures 17 therein. The peripheral portion of this disk 22 is provided with a plurality of radial slits 23 for a purpose presently to be described.

Figure 3:
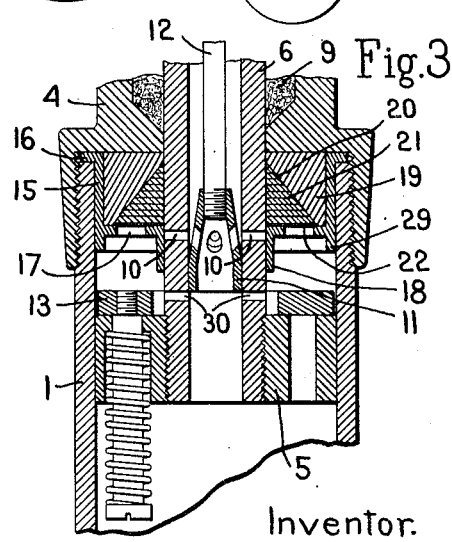
Fig. 3 is an enlarged sectional view showing my improved packing.
Figure 5:
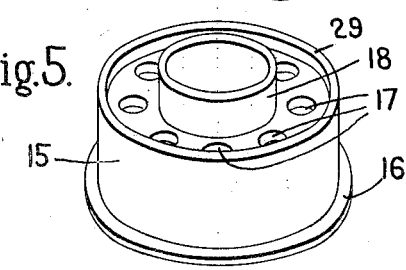
Fig. 5 is a view of the shell or casing in which the packing is received.

The packing 21 will be used in such amount that when the parts are assembled as shown in Fig. 3 said packing will be under considerable pressure and the tapering walls 20 of the bore will tend to cause the packing to fit tightly around the piston rod. Whenever the piston moves upward the valve 13 will close and the piston can then move only as fast as the liquid is able to pass through the ports 10 and 30. The upward movement of the piston occurs during the recoil of the spring of the automobile and if the recoil is a violent one then there will be more or less pressure developed in the cylinder above the piston. This pressure acts against the disk 22 and thus subjects the packing 21 to additional upward pressure, which because of the tapered walls 20 force the packing still more closely around the piston rod. With my device therefore, the packing 21 will be subjected automatically to increased pressure when there is increased pressure in the cylinder. Any wear of the packing which may occur will therefore be automatically taken care of and a tight joint around the piston rod will always exist. The purpose of the slits 23 in the disk 22 is to permit the edge of the disk to bend up as said disk is forced into the converging bore 20.

The hub portion 18 operates to close the ports 10 and 30 when the piston rod approaches the upper end of its stroke, as seen in Fig. 3, and thus traps a small quantity of liquid or air at the upper end of the cylinder. The casing 15 is provided with a peripheral rim 29 situated to be engaged by the valve in case the spring has such a violent recoil as to cause the piston to move to its extreme upper limit. The valve 13 is constructed so that in case the piston is carried to the upper limit of its movement, the hub portion 18 will enter the valve but will not strike the latter. The lower end of the cylinder is provided with a filling opening which is closed by a filling plug 34 and through which liquid may be introduced into the cylinder or drained therefrom.

I claim:

1. In a shock absorber of the type comprising a cylinder having a cylinder head and adapted to contain liquid, a valved piston in the cylinder and a piston rod connected to the piston and extending through the cylinder head, the combination with said cylinder, of a casing in the cylinder separate therefrom and situated therewithin adjacent the cylinder head, said casing having within it a conical-shaped chamber through which the piston rod passes, the larger end of said chamber being directed toward the cylinder, and having an opening therein which forms a communication between the cylinder and chamber, and packing in said chamber encircling the piston rod, said packing being subjected to the pressure in the cylinder.

2. In a shock absorber of the type comprising a cylinder having a cylinder head and adapted to contain liquid, a valved piston in the cylinder and a piston rod connected to the piston and extending through the cylinder head, the combination with said cylinder, of a casing within the cylinder adjacent the cylinder head, a member within the casing provided with a conical bore through which the piston rod passes, said casing having apertures in its end which communicate with the larger end of said bore, packing in said bore, and a resilient disk situated between the packing and the apertured end of the casing whereby pressure which is developed in the cylinder by the piston is transmitted to the packing through said disk.

3. In a shock absorber of the type comprising a cylinder having a cylinder head and adapted to contain liquid, a valved piston in the cylinder and a piston rod connected to the piston and extending through the cylinder head, the combination with said cylinder, of a casing within the cylinder adjacent the cylinder head, a member within the casing provided with a conical bore through which the piston rod passes, said casing having apertures in its end which communicate with the larger end of said bore, packing in said bore, and a resilient disk having a flexible edge situated between the packing and the apertured end of the casing whereby pressure which is developed in the cylinder by the piston is transmitted to the packing through said disk.

In testimony whereof I have signed my name to this specification.

ERNST FLENTJE.